Patented Aug. 19, 1924.

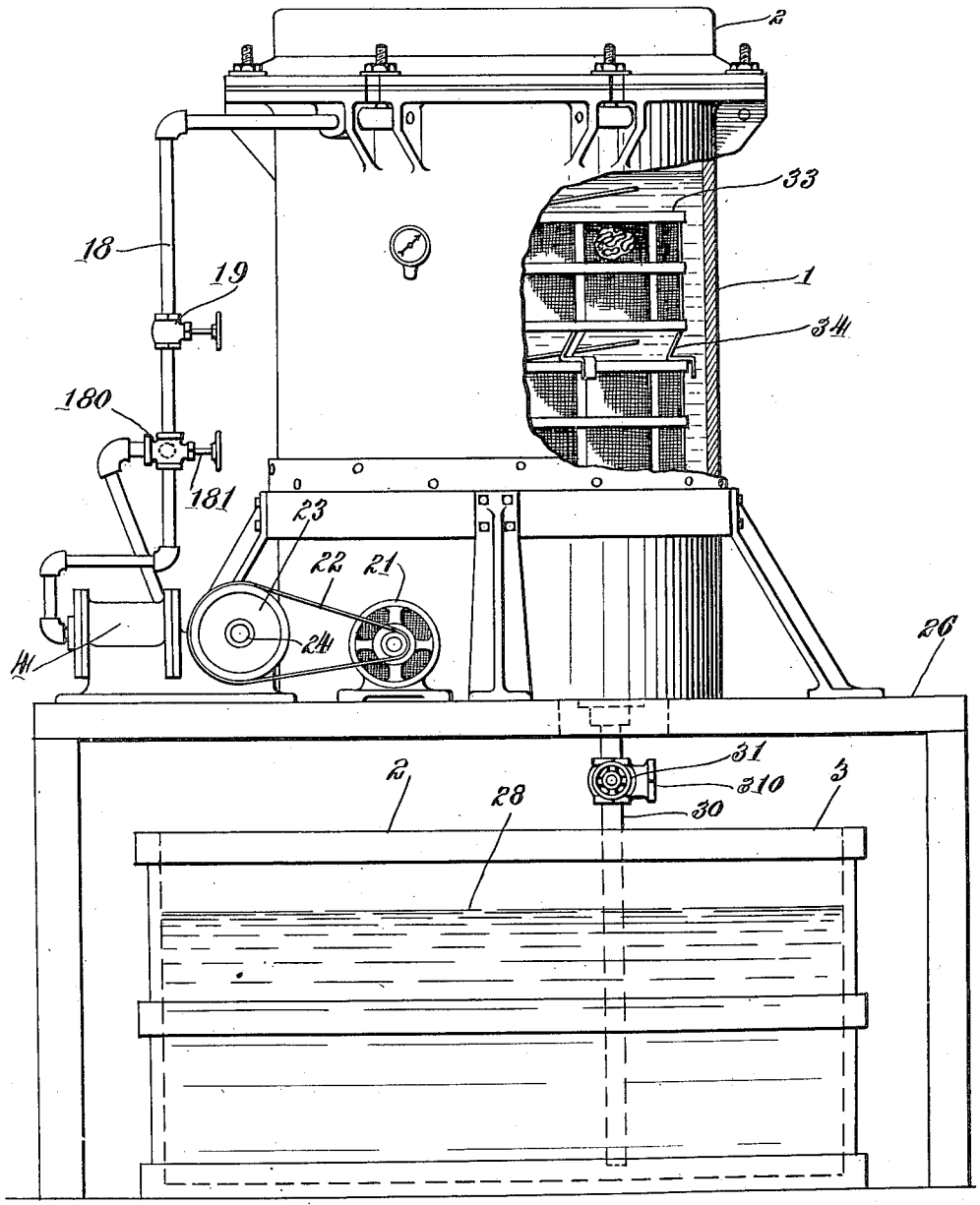

1,505,605

UNITED STATES PATENT OFFICE.

HUNTINGTON D. SAWKINS, OF BALTIMORE, MARYLAND.

METHOD OF SALTING PEANUTS.

Application filed April 7, 1924. Serial No. 704,748.

*To all whom it may concern:*

Be it known that I, HUNTINGTON D. SAWKINS, a citizen of the United States of America, residing in the city of Baltimore, State of Maryland, have invented certain new and useful Improvements in Methods of Salting Peanuts, of which the following is a specification.

The object of the present invention is to produce a new and improved variety of salted peanuts by a novel method which is the subject of my invention, avoiding the excess of grease and salt which are features of the commodity now sold, the new method being cheaper and quicker, and the peanuts being impregnated with just the amount of salt to flavor them. The peanuts are salted in the shell and then roasted so that they have an appearance similar to that of unsalted peanuts but a flavor which is much more attractive to the average taste.

In accordance with the new method, the peanuts are first treated in a vacuum which has the effect of withdrawing the air from within the shell and from the cells within the kernel or meat of the peanuts. After they have been subjected to the action of a vacuum for a sufficient period, which may be of any desired length but which in accordance with the inventor's present practice is about fifteen minutes, they are immersed in brine which is permitted to fill the vacuum. The brine is then removed by gravity or pumping or expelled by air pressure, and the peanuts are treated in any suitable manner as by an air draft or by subjecting them to air pressure, i. e., filling the container with air under pressure and permitting the air to escape in the form of a blast, carrying the liquid with it. The peanuts are then roasted.

Previous attempts at salting peanuts by soaking in brine under pressure have not been successful in the absence of some provision for removing the liquid from the peanuts before roasting. The previous product treated by the old method of salting in brine had the appearance of having been boiled, being soft and rubbery. The present process produces a crisp and attractive product.

The apparatus consists of a vacuum salting tank with means for removing the air therefrom to establish the desired vacuum and suitable connections for introducing and removing brine. The brine tank is most conveniently connected to the lower part of the vacuum tank so that by opening a valve after subjecting the peanuts to the vacuum treatment, the brine is sucked into the tank and held for a sufficient period to impregnate the peanuts, and is then conveniently expelled by pumping air into the tank and then opening the valve leading to the brine tank when the water is blown out, or it may be allowed to run out by gravity. The peanuts are further dried to the best advantage by pumping air into the tank and then releasing it in the form of a blast, blowing the liquid from the peanuts, In the accompanying drawing I have illustrated an apparatus by which my method may be put in practice.

In the drawing the figure is a sectional elevation showing the vacuum salting container in section and the brine tank and the pump for setting up the desired vacuum and pressure in elevation.

Referring to the drawings by numerals, the apparatus as shown consists of a vacuum container 1 open at the top and having a cover 2 with means for securing the same, so that the container is air tight. The apparatus also includes a brine supply tank 3 and a pump 4, or other means for withdrawing air from the container or pumping it full of air when desired to blow out the liquid which wets the nuts after the brine has been withdrawn.

As shown, the air pump 4 is connected by means of a pipe 18 with the container at a point near the top, and the air pipe is controlled by a valve 19. The pump as shown is driven by an electric motor 21 through belt 22 engaging pulley 23 secured to the crank shaft 24 of the pump. Preferably I have connections leading to both sides of the pump, i. e., to the suction and pressure by way of T 180 controlled by three-way valve 181 which connects either suction or pressure to the air pipe 18, the other side being connected at the same time to the atmosphere. This provides for creating a vacuum by exhausting the air in the container or for generating pressure by forcing air into the container as for blowing out the water before or after draining, particularly for drying the peanuts.

As shown, the container is mounted on a suitable raised support 26 which may be the floor of the building. Beneath the support I have shown a brine supply tank 3 containing liquid brine 28.

In the form of the invention shown a pipe 30 leads down from the bottom of the container 1 into the brine tank to a point well beneath the normal level of the brine. This pipe is controlled by a valve 31 and there may be an air opening 310, the valve 31 being a two-way valve for this purpose, so that it may either be closed or opened to permit the brine to be drawn into the tank or opened to the outside air.

In accordance with the method which is the subject of my invention, I first remove the cover 2 and place the peanuts in the container. I may if desired provide baskets 33 with means 34 for spacing the baskets. It is of great advantage to provide spaces between the masses of peanuts, so that the brine may enter and escape easily.

The peanuts having been placed in the container, the cover is closed and clamped, effecting an air-tight closure.

After closing the container the air is removed by operation of the pump with the valves in the corresponding position as outlined, thus subjecting them to the vacuum treatment and providing for an easy absorption of the brine by the peanuts. This vacuum treatment may be accomplished in any suitable manner.

The drawing shows an air pump with means for operating the same, and a pipe connecting the pump to a point near the top of the container with connections to both ends of the pump and valves suitably arranged so that the pump may be used to either exhaust the air in the container or apply pressure. The pump is operated to exhaust the air in the present instance until a marked vacuum is produced, the higher the vacuum the more quickly will the brine be drawn into the container and absorbed by the peanuts.

In accordance with the preferred form of my process I treat the peanuts under vacuum from 15 to 20 minutes to half an hour, but the period of the vacuum treatment may be widely varied within the scope of my invention, the exact period of treatment being in no wise essential.

When the air has been sufficiently exhausted, connection is made to the brine tank in any suitable manner. I preferably close the valve 19 to prevent the brine from entering the pump and open the valve 31 in the brine pipe to provide for the entrance of the brine into the container, the same being drawn by suction from the supply tank. The valve 31 is closed when the passage of the brine has ceased in order to hold the brine in contact with the peanuts. I allow the peanuts to stand in the brine preferably about 20 minutes, the preferred solution being about 100 hydrometer test. I then release the brine, permitting it to flow back into the tank or force it out by pumping air into the air space in the container above the brine. To dry the product I may pump air into the container either blowing it through or fill the container with air under pressure and then release it, repeating this operation one or more times, blowing the moisture out of the container and drying the salted peanuts. The peanuts are then roasted in the usual manner. I then take them out of the container and allow them to stand about 20 minutes.

The process described has the advantages that it may be performed cheaply and quickly, making it profitable to treat large quantities of peanuts at one time, it eliminates the expense of shelling the peanuts prior to salting, so that the peanuts have just the desired salty taste without an excess of salt on the surface, and that when thus salted and roasted, they are crisp and attractive, avoiding the greasy effect of the salted peanuts now on the market and the soft rubbery appearance of the boiled product.

I have thus described specifically and in detail a method of salting peanuts embodying my invention in the preferred form in order that the nature and operation of my process may be clearly understood; however, the specific terms herein are used descriptively rather than in a limiting sense, the scope of the invention being defined in the claims.

What I claim and desire to secure by Letters Patent is:

1. The method of salting peanuts in the shell which consists in submerging them in brine, removing the brine and drying by alternately subjecting them to air pressure and releasing the air, producing the effect of an air blast.

2. The method of salting peanuts in the shell which consists in subjecting them to the action of a vacuum and immediately thereafter submerging them in brine, then removing them from the brine, drying and roasting.

3. The method of salting peanuts in the shell which consists in first subjecting them to the action of a vacuum and immediately thereafter submerging them in brine, then removing them from the brine and drying by subjecting them to the action of an air blast.

4. The method of salting peanuts in the shell which consists in first subjecting them to the action of a vacuum and immediately thereafter submerging them in the brine and drying by subjecting them to the action of air under pressure and releasing the air pressure and permitting the air the escape in the form of a blast, drawing the moisture from the peanuts.

Signed by me at Baltimore, Maryland, this 4th day of April, 1924.

HUNTINGTON D. SAWKINS.

Witnesses:
PORTER H. FLAUTT,
E. WEHMEYER.